United States Patent [19]

Miyake et al.

[11] Patent Number: 4,825,324
[45] Date of Patent: Apr. 25, 1989

[54] STILL VIDEO CAMERA WITH CONTINUOUS PICTURE-TAKING MODE

[75] Inventors: Izumi Miyake; Kiyotaka Kaneko, both of Kawasaki; Kimihide Takahashi; Kazuya Oda, both of Tokyo, all of Japan

[73] Assignee: Fuji Photo Film Co., Ltd., Kanagawa, Japan

[21] Appl. No.: 90,338

[22] Filed: Aug. 28, 1987

[30] Foreign Application Priority Data

Aug. 29, 1986 [JP] Japan .................................. 61-201682
Sep. 2, 1986 [JP] Japan .................................. 61-206207

[51] Int. Cl.⁴ ......................... H04N 5/78; G11B 21/08
[52] U.S. Cl. ................................. 360/35.1; 360/78.06; 358/906
[58] Field of Search .................. 360/35.1, 75, 78, 109; 358/906

[56] References Cited

FOREIGN PATENT DOCUMENTS 0140507 10/1979 Japan .................................. 358/906
0140515 10/1979 Japan .................................. 358/906

Primary Examiner—Eugene R. LaRoche
Assistant Examiner—David Mis
Attorney, Agent, or Firm—Birch, Stewart, Kolasch & Birch

[57] ABSTRACT

When a disc pack containing a magnetic disc is loaded in a still video camera, all tracks on the magnetic disc are searched to determine whether each track has been recorded on or is blank, and the results of the search are stored in memory. If a continuous picture-taking mode has been set, the magnetic head is fed forwardly from a home position and is positioned on a track next to the last track recorded on. Since all of the remaining tracks from the track at which the head has been positioned to the final track of the disc will be blank, feeding of the magnetic head during the continuous picture-taking operation is simplified. In other words, in the continuous picture-taking mode, it will suffice merely to feed the head one track at a time each time a still picture is taken.

6 Claims, 5 Drawing Sheets

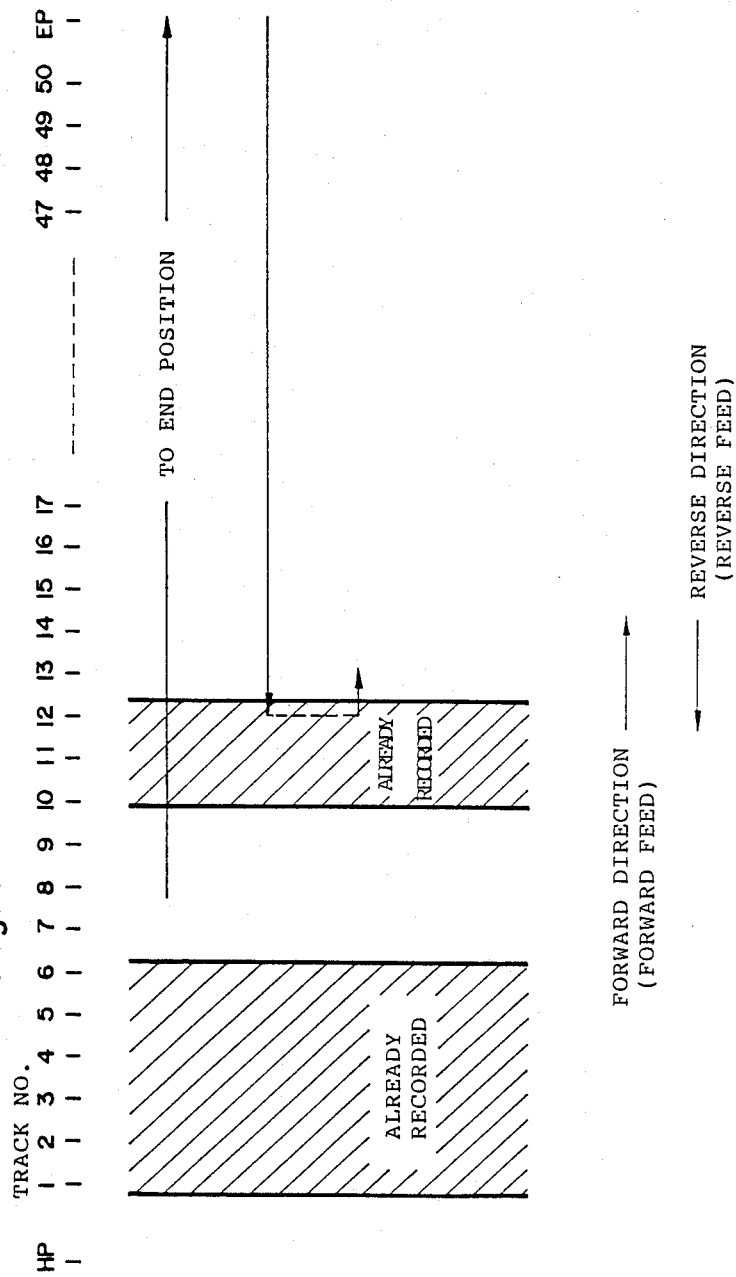

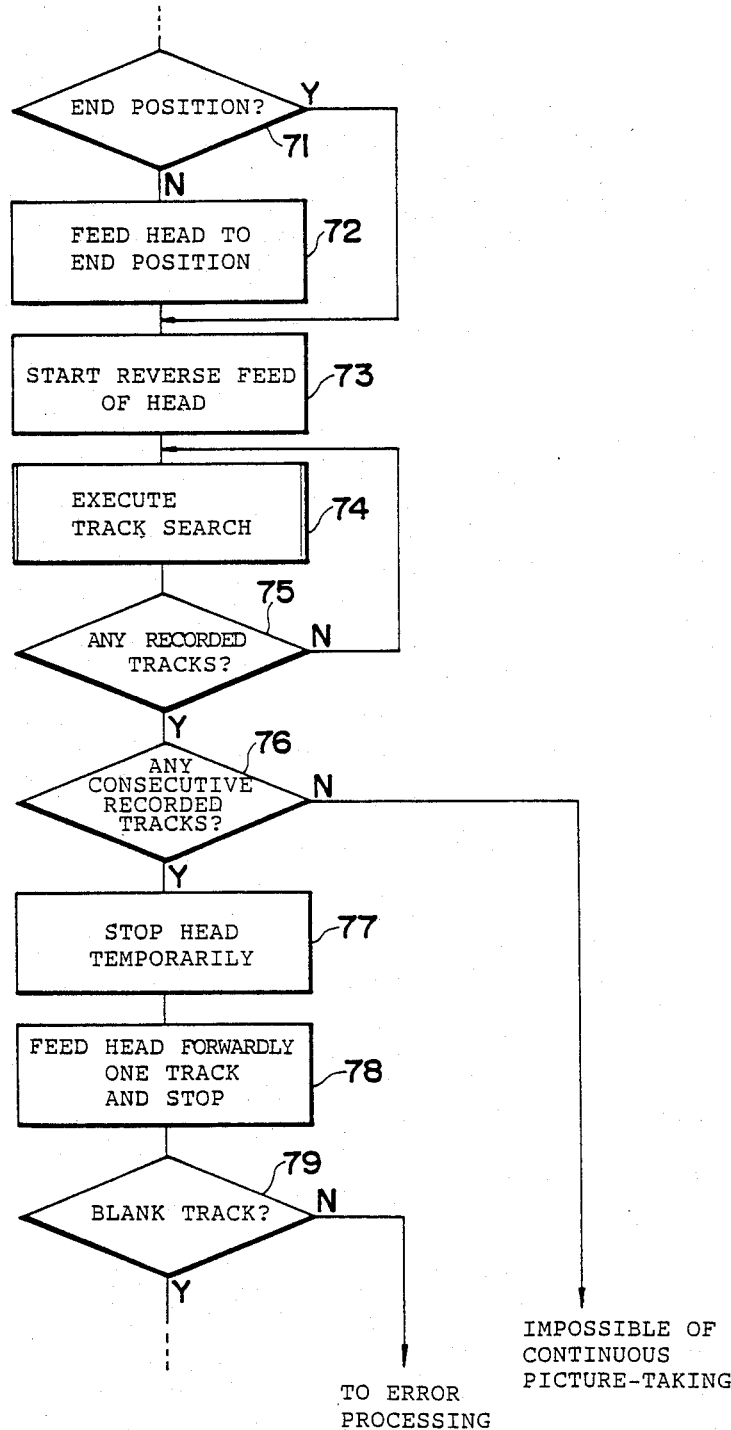

STILL VIDEO CAMERA WITH CONTINUOUS PICTURE-TAKING MODE

BACKGROUND OF THE INVENTION

This invention relates to a still video camera, also referred to as an electronic still camera, in which a subject is imaged by an electronic imaging device and the resulting still video signal is stored on a magnetic disc. More particularly, the invention relates to a still video camera of the abovedescribed type having a continuous picture-taking mode.

When a still video camera operates in a continuous picture-taking mode, a subject is imaged at fixed time intervals (e.g. every 1/6 sec or 1/10 sec) while the operator holds the camera shutter release button depressed, and the resulting video signals are sequentially recorded on successive tracks of the magnetic disc. Accordingly, adjustment of shutter release, aperture opening and the like must be performed each time a picture is taken. However, transferring the magnetic head to and positioning the head at the next blank recording track, which are the operations requiring the most time and involving complicated processing, must also be performed within the abovementioned time interval. If it were merely a matter of transferring the magnetic head to the neighboring track each time a picture is taken, the sequence would be comparatively simple. However, a check must be performed to determine whether the next track has already been recorded on or not. If it is found that the track has been recorded on, a search must be made to find the next blank track. The processing for these operations is not only complicated but time-consuming and is not always capable of being completed in the abovementioned time period. The result is that a longer picture taking interval is required in the continuous picture-taking mode..

SUMMARY OF THE INVENTION

Accordingly, an object of the present invention is to simplify the magnetic head feed sequence by securing consecutive blank tracks in advance in order to record still pictures in the continuous picture-taking mode.

According to the present invention, the foregoing object is attained by providing a still video camera with a continuous picture-taking mode comprising a magnetic head transfer unit for transferring a magnetic head radially of a magnetic disc and positioning the magnetic head on a predetermined track of the magnetic disc, continuous picture-taking mode setting means, track searching means for feeding the magnetic head across all tracks of the magnetic disc at initial processing, distinguishing between tracks already recorded on and blank tracks on the basis of output signals from the magnetic head and storing the results, and means for controlling the magnetic head transfer unit in such a manner that the magnetic head is transferred in a forward direction and positioned on a track which is next to a final recorded track in a case where the continuous picture-taking mode has been set.

It is most common and fundamental for initial processing to be performed when a disc pack containing a magnetic disc is first loaded in a still video camera. However, it is also permissible for the abovementioned track search processing to be executed when a power supply switch is turned on or when a changeover is made to the continuous picture-taking mode. Though it is preferred that track search processing be performed without relation to the type of mode set, it is also permissible to execute this processing when the continuous picture-taking mode is set.

The most basic operating mode of a still video camera is a single picture-taking mode, in which a still picture equivalent to one frame is taken when the shutter release button is pressed. It will suffice if the magnetic head is positioned on the aforementioned track next to the final recorded track in either the single picture-taking mode or continuous picture-taking mode. Alternatively, if the single picture-taking mode has been set, it will suffice if the magnetic head is fed in the forward direction and positioned at the first blank track encountered.

In accordance with the invention, all tracks of the magnetic disc are searched in advance to determine whether they have been recorded on or whether they are blank, and the results of this determination are stored in memory. If the continuous picture-taking mode is in effect, the magnetic head is positioned on the track next to the final recorded track based on the results of the search. This means that all tracks from the track at which the magnetic head is positioned to the final track of the magnetic disc will be blank tracks. Accordingly, it will suffice merely to feed the magnetic head to the next track each time a picture is taken in a continuous picture-taking operation. Thus, the processing routine is simplified.

In a case where the track search processing time is to be shortened, the above-described track searching means and control means are substituted by means for determining whether each track is a recorded track or blank track based on a signal read by the magnetic head while the head is being fed in the reverse direction from a limit position in the reverse direction, and controlling the transfer unit in such a manner that the magnetic head is stopped temporarily at the position of the first recorded track encountered and the magnetic head is thereafter fed one track in the forward direction and positioned at the track attained.

Thus, stated in more general terms, the still video camera of the present invention is characterized by having means for controlling the transfer unit in such a manner that the magnetic head is positioned at a track, from which to the final track, a succession of blank tracks resides.

BRIEF DESCRIPTION OF THE DRAWINGS

FIGS. 4 and 5 illustrate another embodiment of the invention, in which FIG. 4 illustrates the manner in which the magnetic head is transferred, and FIG. 5 is a flowchart illustrating magnetic head transfer processing.

DETAILED DESCRIPTION OF THE PREFERRED EMBODIMENTS

Figure 1:
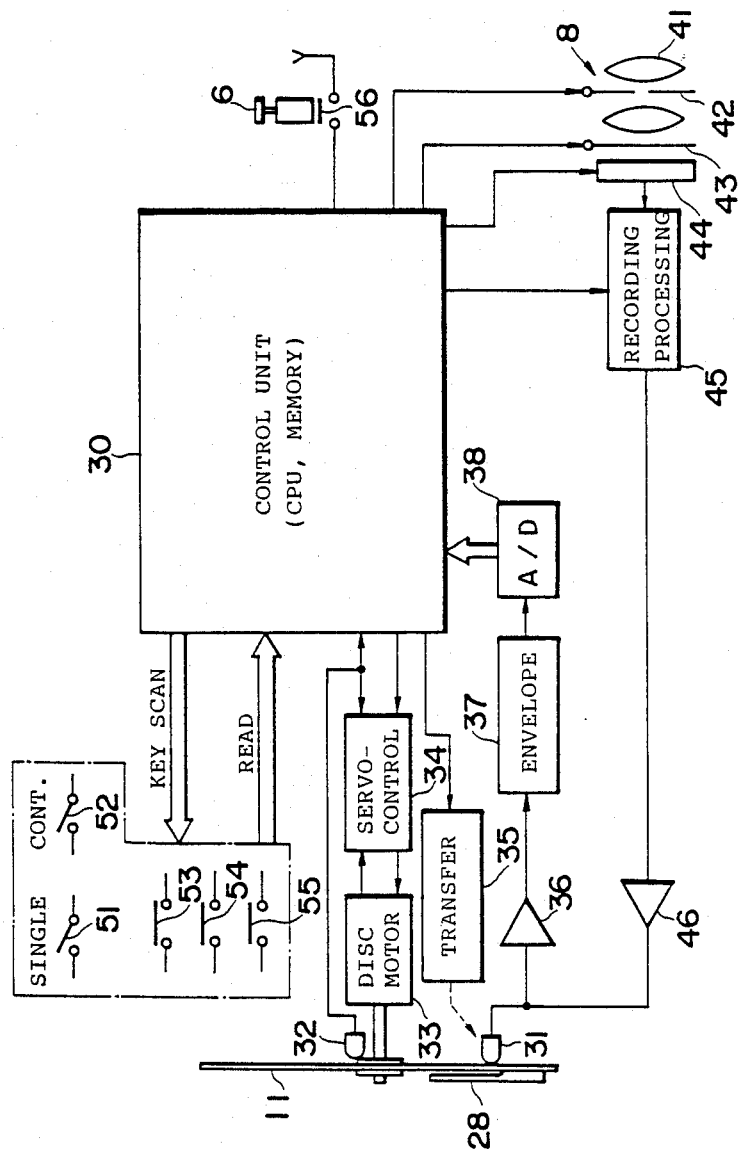
FIG. 1 is a block diagram illustrating part of the electrical construction of a till video camera according to the present invention.

FIG. 1 schematically illustrates part of the electrical construction of a still video camera with a continuous picture-taking mode according to the present invention.

A magnetic disc 11 is housed in a disc pack in a rotatable state. A still video camera is provided with a bucket capable of being freely opened and closed and for receiving the disc pack when opened. After the disc pack is so loaded, the bucket is closed, at which time the magnetic disc 11 is chucked on the spindle of a disc motor 33.

The magnetic disk 11 is provided with a plurality (e.g. 50) of circular, concentrically disposed tracks having a track pitch of e.g. 100 μm. Magnetically recorded on each track by imaging processing is a frequency-modulated color still video signal (inclusive of luminance and chrominance signals, etc.) corresponding to one field or one frame.

Figure 2:
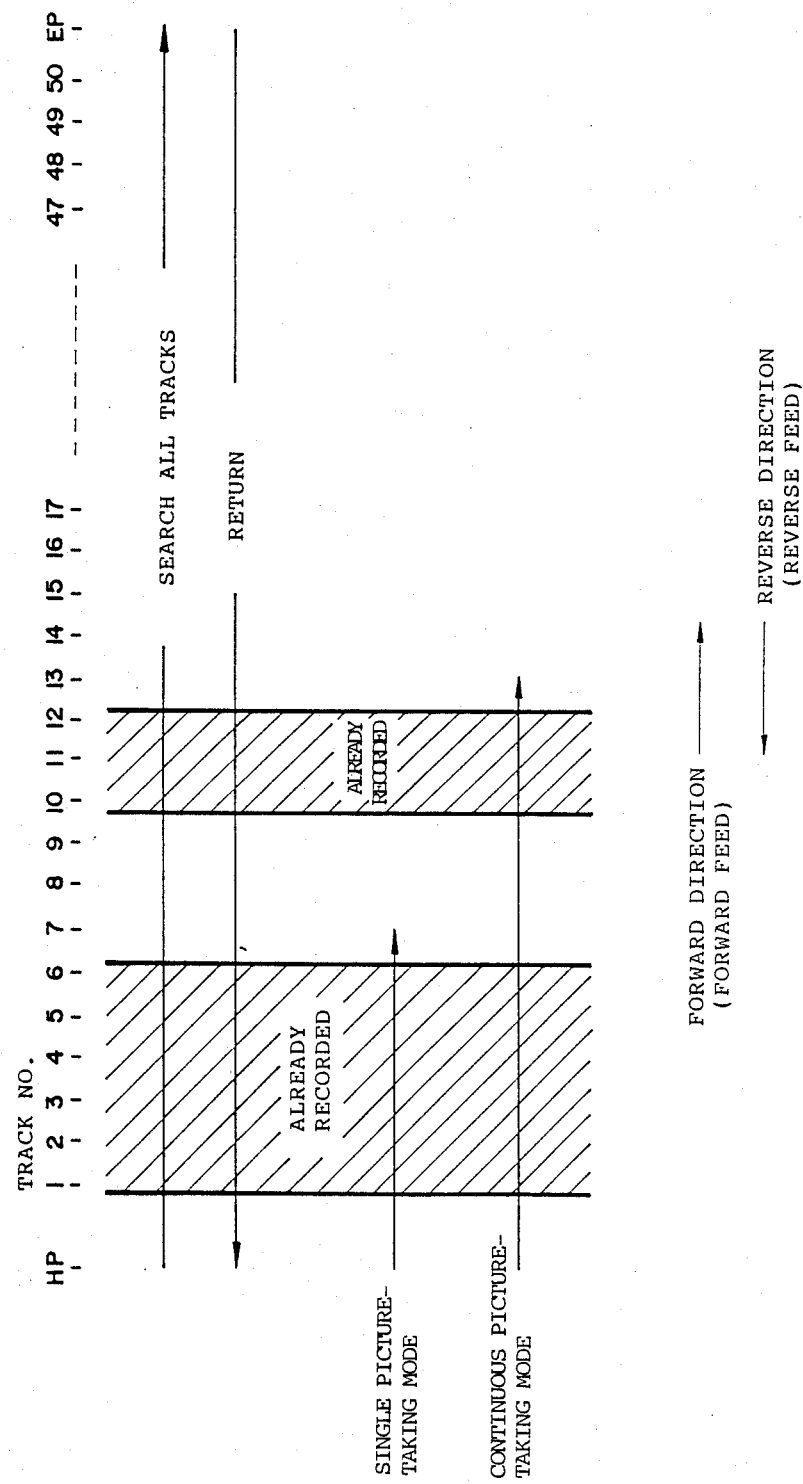
FIG. 2 is a view illustrating movement of a magnetic head in track search processing and subsequent magnetic head transfer processing according to an embodiment of the invention.

The 50 tracks concentrically provided on the magnetic recording surface of the magnetic disk 11 are numbered consecutively from No. 1 to No. 50 starting from the outer side of the disk as shown in FIG. 2. A home position HP (namely an origin position or standby position) is situated on the outer side of track No. 1. When a magnetic head 31, described below, arrives at the home position HP, this is sensed by a home position switch 55. Specifically, the switch 55 is a limit switch, photoelectric switch or other switch for sensing the magnetic head 31 or a portion belonging thereto. An end position EP is situated on the inner side of track No. 50. It is possible to provide an end position switch and sense arrival of the magnetic head 31 at the end position by this switch. Alternatively, it is possible to sense the end position based on the number of drive pulses (shift pulses) applied to a head transfer stepping motor, described below, just as in the positioning of the magnetic head 31 on each track.

The direction from track No. 1 to track No. 50 is the forward direction, and the opposite is the reverse direction.

Operation of each component of the still video camera and operation of the camera as, a whole are under the control of a control unit 30. The latter comprises a central processor, preferably a microprocessor (hereinafter referred to as a "CPU"), a memory for storing programs executed by the CPU as well as the required data, and an interface for interfacing peripheral elements, circuits and devices.

A transfer drive controller 35 is provided for supporting the magnetic head 31, which writes a still video signal of an imaged subject on a predetermined track of the magnetic disc 11. The transfer drive controller 35 supports the magnetic head 31 in such a manner that the head 31 may travel freely in the radial direction of the magnetic disk 11, and controls the travel of the head 31 radially of the disk. The control unit 30 provides the controller 35 with commands regarding the direction in which the magnetic head 31 is to be moved and the amount of such movement. The controller 35 includes a stepping motor (not shown) for moving the magnetic head 31 by an amount proportional to the angle through which the motor is rotated. By way of example, for each drive pulse applied to the stepping motor, the motor rotates through about 15°, whereby the magnetic head 31 is shifted by about pb 4.2 μm. This allows the magnetic head 31 to be moved with great precision.

The distance from the home position HP to each track is predetermined. Positioning the magnetic head 31 on each track is performed by controlling the amount the magnetic head 31 is fed from the home position HP, i.e. by controlling the number of drive pulses applied to the stepping motor.

In order to achieve good contact between the magnetic head 31 and the rotating magnetic disc 11, a regulating plate 28 is provided on the side of the magnetic disc 11 opposite the magnetic head 31. A phase detector 32 for generating one pulse each time the magnetic disc 11 makes one full revolution is provided in close proximity to the core of the magnetic disc 11.

The detection pulse from the phase detector 32 is inputted to a servo-control circuit 34 and the control unit 30. The disc motor 33 is subjected to feedback control by the servo-control circuit 34 so as to be rotated at a constant speed, e.g. 3,600 rpm. The servo-control circuit 34 is also adapted to start and stop the motor 33 in response to commands from the control unit 30.

The still video camera has an imaging optical system 8 comprising an imaging lens system 41 for forming the image of a subject, a diaphragm 42 and an optical shutter 43. The diaphragm 42 is controlled by the control unit 30 based on the level of a light reception signal from a light-receiving element (not shown) arranged in the optical path. The optical shutter 43 is controlled by the control unit 30 in accordance with the set mode (single or continuous picture-taking mode) in response to an input from a switch 56 closed by the operator's pressing a shutter release button 6. The shutter release button 6 preferably is of the type having a two-step stroke. Pressing the button 6 through the first step of its stroke closes a first switch, whereby the disk motor 33 is started. Pressing the button 6 through the second step of its stroke closes a second switch (equivalent to closing the switch 56), whereby the photographic and recording operations are started.

A solid-state imaging device 44 comprising a two-dimensional imaging cell array such as a CCD is arranged in the focal plane of the optical system 8. Video data stored in the imaging device 44 is read in the form of a serial video signal in synchronism with vertical and horizontal synchronizing signals provided by the control unit 30. The luminance signal component and color difference signal component of this signal are frequency modulated by a recording signal processing circuit 45, which mixes the resulted modulated signals and applies them to a driver circuit 46. When the magnetic disc 11 is rotated at the aforementioned constant rotational speed, a frequency-modulated video signal is written on a predetermined track by the magnetic head 31.

In track search processing, the signal read by the magnetic head 31 is delivered to an envelope detector circuit 37 via a preamplifier 36. The envelope detector circuit 37 detects the envelope of the signal read by the magnetic head 31, namely the envelope of the frequency-modulated video signal recorded on a track of the magnetic disk 11, and outputs a voltage signal corresponding to the detected envelope. This voltage signal representing the envelope is fed into an analog/digital (A/D) converter 38, which proceeds to convert the signal into an eight-bit digital signal representing a quantization level of e.g. 256. This signal enters the control unit 30.

The envelope detection signal is used in determining whether a track on the magnetic disc 11 is blank or is a track that has been recorded on, namely a "recorded"

track. If the detection signal level does not reach a predetermined threshold level when the magnetic head 31 is fed across a track, that track is blank. If the threshold level is reached, the track is a recorded track.

The still video camera has a single picture-taking mode in which one frame of a still picture is recorded on the magnetic disc 11 each time the shutter release button 6 is pressed, and a continuous picture-taking mode in which still pictures are taken one at a time and stored successively on the magnetic disc 11 at a fixed time intervals (e.g. every 1/6 sec or 1/10 sec) while the shutter release button 6 is being held pressed by the operator. A single picture-taking mode switch 51 and a continuous picture-taking mode switch 52 are provided in order to select these modes. It is also possible to provide solely a continuous picture-taking mode selection switch, in which case the single picture-taking mode would be set automatically in the absence of an input from this switch.

In addition to controlling the rotation of the magnetic disc 11, the recording of the video signals and the track search operation, the control unit 30 controls the reading of signals from the various switches and the operation of the camera based on the signals read.

In addition to the aforementioned mode switches 51, 52, various other switches that have a bearing on the present invention include a load end switch 53 for sensing that the camera bucket accommodating the magnetic disc 11 has been closed to a position at which the disc 11 will be loaded on the spindle of the disc motor 33, a pack switch 54 for sensing that the disc pack has been received in the closed bucket, and the aforementioned home position switch 55. The control unit 30 executes a key scan routine at a fixed time interval (e.g. every 1/60 sec). In the key scan routine, the control unit 30 transmits key scan pulses to the aforementioned group of switches, senses whether a switch is open or closed based on whether a transmitted key scan pulse returns or not, and stores the results of the key scan in memory. It is also possible to use this key scan routine to sense the state of the shutter switch 56 operatively associated with the shutter release button 6, and to apply an interrupt to the CPU of control unit 30 in response to an ON signal from the switch 56 indicating that the switch is closed.

In addition to the abovementioned keys and switches, it is also possible to provide a switch for setting the number of frames to be taken per second in the continuous picture-taking mode, namely the continuous picture-taking speed. By using this switch, it would be possible to select any desired continuous picture-taking speed from among the following, which serve as examples only: 10 frames/sec, 5 frames/sec, 2 frames/sec, 1 frame/sec, 1 frame/2 sec and 1 frame/5 sec.

In the illustrated embodiment, pictures are taken at a fixed time interval while the shutter release button 6 is being pressed in the continuous picture-taking mode. If a switch for setting the number of frames to be taken in the continuous picture-taking mode is provided and a desired number of frames is set by using this switch, then an arrangement can be adopted in which the set number of frames is taken continuously merely by pressing the button 6 once. Alternatively, it may be arranged so that only the set number of frames can be taken even if the button 6 is held pressed continuously.

Preferably, a buzzer is provided for generating an audible alarm if the magnetic disc 11 does not possess a blank track.

Transfer and positioning of the magnetic head 31 in a photographic operation will now be described.

Figure 3:
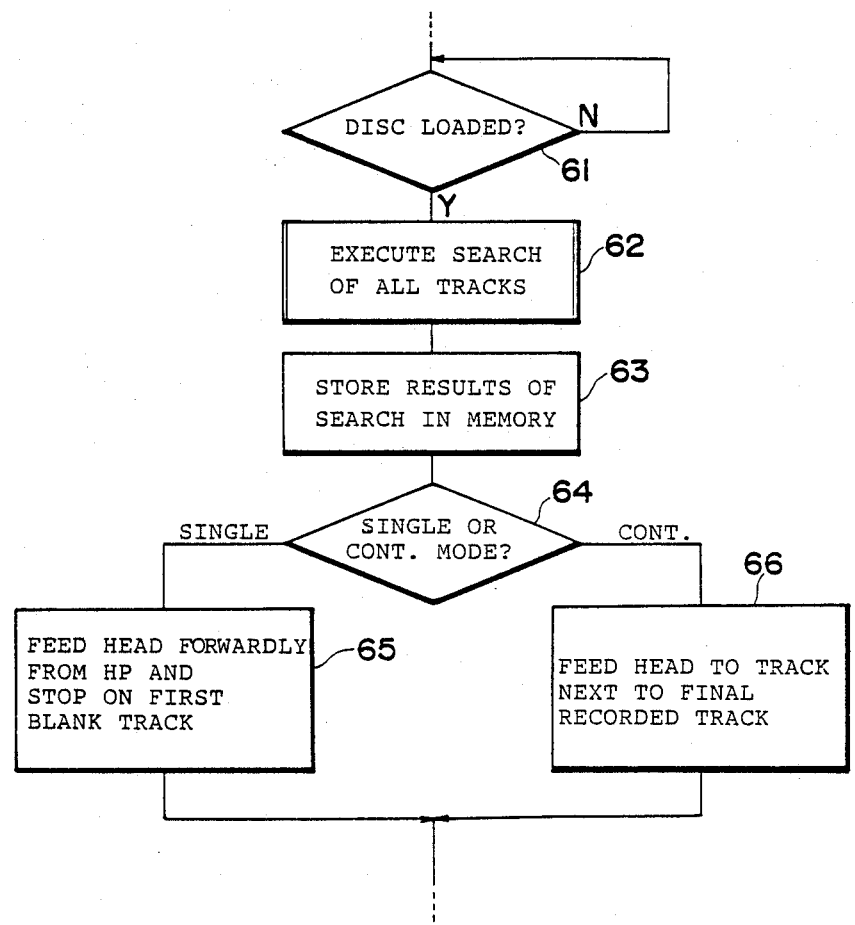
FIG. 3 is a flowchart illustrating the aforementioned track search processing and subsequent magnetic head transfer processing.

When a disc pack containing the magnetic disc 11 has been inserted into the bucket and the bucket has been closed, meaning that the magnetic disc has been loaded, the processing shown in FIG. 3 starts to be executed. FIG. 2 illustrates the manner in which the magnetic head 31 moves in accordance with this processing.

Loading of the magnetic disc 11 is sensed at a step 61 based on a change in state, namely from off (opened) to on (closed), in the load end switch 53 and pack switch 54.

Next, at a step 62, the magnetic head 31, which is located at the home position HP or which has been returned to the home position HP, is fed to the end position in the forward direction, and it is deterrmined in the course of head feed whether each of the tracks from No. 1 to No. 50 is a recorded track or blank track. The results of the determination are stored in memory at a step 63. Thereafter, the magnetic head is returned temporarily to the home position HP. It shall be assumed that Track Nos. 1 through 6 and Nos. 10 through 12 are found to be recorded tracks in this track scanning routine. The hatched portions in FIG. 2 indicate these tracks.

Step 64 calls for a determination as to whether the set mode is the single picture-taking mode or the continuous picture-taking mode. If the former is the set mode, then the magnetic head 31 is fed forwardly from the home position HP and is stopped when it reaches the first blank track (Track No. 7 in FIG. 2) at a step 65. If the continuous picture-taking mode is the set mode, then the magnetic head 31 is fed forwardly from the home position HP and is stopped when it reaches the track (Track No. 13 in FIG. 2) next to the final recorded track on the disk (Track No. 12 in FIG. 2). This is step 66 of the flowchart.

When the magnetic head 31 is thus positioned and the shutter release button 6 is pressed, picture taking and recording processing are executed in accordance with the set mode. When the set mode is the single picture-taking mode, a video signal equivalent to one still picture is recorded on the track at No. 7, after which the magnetic head 31 is positioned on the next track (Track No. 8). If the set mode is the continuous picture-taking mode, picture taking and recording proceed while the magnetic head 31 is successively advanced one track at a time at the fixed time intervals during the time that the shutter release button 6 is being pressed. Thus, first a still video signal is recorded on Track No. 13, then the head is fed to the next track, namely Track No. 14, a video signal is recorded on Track No. 14 a fixed period of time after the preceding picture-taking operation, then the magnetic head is fed to the next track, and so on. Since the magnetic head 31 is positioned on the track (Track No. 13) next to the final recorded track, all tracks from this track to the last track (Track No. 50) on magnetic disc 31 are blank, so that it will suffice to control the magnetic head 31 in such a manner that the head is fed one track at a time. Thus, control is simplified.

In a camera where the magnetic head 31 returns to the home position HP if the main power supply is turned off before the magnetic head 31 arrives at Track No. 50 (i.e. where the head returns to the home position HP a fixed period of time after the main power supply is turned off), the track search of step 62 in FIG. 3 can be omitted when the main power supply is turned on again if the data stored in memory at step 63 and the data relating to the track number of the track having the results of photography recorded thereon are left in the memory without being erased. It is of course possible to adopt an arrangement in which the processing from step 62 onward is executed whenever the main power supply is turned on.

In general, a still video camera is equipped with a main power supply for the driver circuits and an auxiliary power supply for maintaining the control unit 30 in the standby mode. In the standby mode, only the minimum required functions are operating, such as a timekeeping function. When the main power supply is off, the abovementioned key scanning routine generally is not performed. Accordingly, when the magnetic disc is exchanged or loaded with the main power supply in the off state, the decision processing of step 61 is impossible to execute. For this reason, therefore, it is preferred that the processing from step 62 onward be executed without fail when the main power supply is turned on.

In another option, it is possible to adopt an arrangement (see the specification of Japanese Patent Application No. 61-10985) in which the fact that the magnetic disc has been exchanged or loaded when the main power supply is off is mechanically stored. Then, when the main power supply is turned on, the status of the mechanical recording means is read and the decision processing of step 61 is executed. In yet another option, it is possible to adopt an arrangement (see the specification of Japanese Patent Application No. 61-10984) in which the fact that the magnetic disc has been loaded is stored electrically by power from the auxiliary power supply or electrically by turning on the main power supply temporarily. Then, when the main power supply is turned on, the electrical memory is checked and the decision processing of step 61 is executed.

An arrangement can be adopted in which if the set mode is the single picture-taking mode, the processing of steps 62, 63 is deleted, a blank track is searched out while the magnetic head 31 is fed forwardly from the home position HP, and the magnetic head 31 is positioned on the first blank track.

In the embodiment described above, all tracks on the magnetic disc are searched and the magnetic head 31 is reciprocated between the home position HP and the end position EP. The time required for this operation can be a problem.

Reference will be had to FIGS. 4 and 5 to describe another embodiment in which the positioning of the magnetic head 31 in the continuous picture-taking mode is performed as quickly as possible. The construction of the still video camera for practicing this embodiment is the same as that shown in FIG. 1.

If the disc pack containing the magnetic disc 11 has been loaded in the camera at the prescribed position and the continuous picture-taking mode has been set, the magnetic head 31 is checked to determine whether it is located at the end position EP at a step 71 based on the number of drive pulses applied to the stepping motor of the transfer drive controller 35 or based on the status of the end position switch. If the magnetic head 31 is not at the end position EP, then the head is fed forwardly up to the end position EP at a step 72.

Next, the magnetic head 31 is fed in the reverse direction from the end position EP at a step 73. While the head is thus being fed, a search is performed at a step 74 to determine whether each track is a recorded track or blank track. The results of the search are stored in memory. The first time a recorded track is found during the reverse feed of the magnetic head 31 (step 75), the head is stopped at the position of this first recorded track at a step 77. Then, based on the results of the search stored in the memory, it is determined at a step 76 whether two or more consecutive blank tracks exist between the end position EP and the aforementioned first recorded track. If two or more consecutive blank tracks do exist, continuous picture taking is possible. Accordingly, the magnetic head 31 is fed one track in the forward direction and is eventually positioned at the track next to that at which it was temporarily brought to a halt (step 78). It is confirmed at a step 79 that this track is blank. The program then proceeds to the picture-taking operation.

If two or more consecutive blank tracks do not exist between the end position EP and the aforementioned first recorded track, continuous picture taking is not possible and the operator is informed of this fact by an indicator lamp or the like. If the track at which the magnetic head is finally positioned is a recorded track, this means that an error of some kind has occurred. In such case, it is desirable to return the magnetic head 31 to the end position EP again and repeat processing from step 73 onward.

Thus, by virtue of the above-described processing in accordance with the other embodiment of the invention, the positioning of the magnetic head in the continuous picture-taking mode can be performed in a comparatively short period of time.

As many apparently widely different embodiments of the present invention can be made without departing from the spirit and scope thereof, it is to be understood that the invention is not limited to the specific embodiments thereof except as defined in the appended claims.

What is claimed is;

1. A still video camera with a continuous picture-taking mode, comprising:
   a magnetic head transfer unit for transferring a magnetic head along the radius of a magnetic disc having a plurality of tracks and positioning the magnetic head on a predetermined track of the magnetic disc;
   continuous picture-taking mode setting means;
   track searching means for transporting the magnetic head across all tracks of the magnetic disc during initial processing, distinguishing between recorded tracks and blank tracks on the basis of output signals from the magnetic head, and storing the results of the distinguishing operation; and
   mean for controlling said magnetic head transfer unit on the basis of said results such that the magnetic head is transferred in a forward direction and positioned on a track which is next to a final recorded track when the continuous picture-taking mode has been set.

2. The still video camera according to claim 1, wherein said control means controls said transfer unit to position the magnetic head next to the final recorded track in both a single picture-taking mode and the continuous picture-taking mode.

3. The still video camera according to claim 1, wherein said control means controls said transfer unit to transfer the magnetic head in the forward direction to be positioned on a first blank track in a case where a single picture-taking mode has been set.

4. A still video camera with a continuous picture-taking mode, comprising:

a magnetic head transfer unit for transferring a magnetic head along the radius of a magnetic disc having a plurality of tracks and positioning the magnetic head on a predetermined track of the magnetic disc;

continuous picture-taking mode setting means; and means for determining, in response to the setting of the continuous picture-taking mode, whether each track is a recorded track or blank track based on a signal read by the magnetic head while the head is being transported in a reverse direction from a limit position adjacent the last track on the disc, and controlling said transfer unit such that the magnetic head is stopped temporarily at a first recorded track encountered and is thereafter transported in a forward direction and positioned at the next track attained.

5. The still video according to claim 4, wherein said control means determines the position of the magnetic head before said positioning control and controls said transfer unit to transfer the magnetic head to the limit position if the magnetic head is not located at said limit position.

6. The still video camera according to claim 4, wherein said control means determines whether two or more blank tracks exist between the limit position and the position of the first recorded track, and, if said two or more blank tracks do not exist, generates an output indicating that continuous picture taking is impossible.

* * * * *